United States Patent
Cohen et al.

(10) Patent No.: US 9,557,921 B1
(45) Date of Patent: Jan. 31, 2017

(54) VIRTUAL VOLUME CONVERTER

(71) Applicant: EMC Corporation, Hopkinton, MA (US)

(72) Inventors: Saar Cohen, Moshav Mishmeret (IL); Assaf Natanzon, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 57 days.

(21) Appl. No.: 14/669,377

(22) Filed: Mar. 26, 2015

(51) Int. Cl.
  *G06F 12/00* (2006.01)
  *G06F 3/06* (2006.01)
  *G06F 9/455* (2006.01)
  *G06F 13/00* (2006.01)
  *G06F 13/28* (2006.01)

(52) U.S. Cl.
  CPC .......... *G06F 3/0613* (2013.01); *G06F 3/0665* (2013.01); *G06F 3/0689* (2013.01); *G06F 9/4555* (2013.01); *G06F 2003/0692* (2013.01); *G06F 2212/262* (2013.01)

(58) Field of Classification Search
  CPC .... G06F 3/0613; G06F 3/0689; G06F 3/0665; G06F 9/4555; G06F 2212/262; G06F 2003/0692
  See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 | 12/2012 | Natanzon et al. | |
| 8,370,648 B1 | 2/2013 | Natanzon | |
| 8,380,885 B1 | 2/2013 | Natanzon | |
| 8,392,680 B1 | 3/2013 | Natanzon et al. | |

(Continued)

*Primary Examiner* — Mark Giardino, Jr.

(74) *Attorney, Agent, or Firm* — Daly, Crowley, Mofford & Durkee, LLP

(57) ABSTRACT

In one aspect, a method includes providing virtual volumes (VVols) and mappings from the VVols to corresponding data storage devices to an I/O filter in a first virtual machine (VM), sending control path commands sent from the first VM to a control-path manager VM, the first VM and the control-path manager VM being run on a VM host, intercepting an I/O for a VVol using the I/O filter and sending the intercepted I/O to a data storage device mapped to the VVol.

19 Claims, 3 Drawing Sheets

(56) References Cited

U.S. PATENT DOCUMENTS

| | | |
|---|---|---|
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 2002/0087780 A1* | 7/2002 | Selkirk ............ G06F 3/0605 711/6 |
| 2003/0126327 A1* | 7/2003 | Pesola ............ G06F 3/0601 710/74 |
| 2004/0068561 A1* | 4/2004 | Yamamoto ...... G06F 3/0605 709/224 |
| 2005/0071560 A1* | 3/2005 | Bolik ............ G06F 3/0605 711/117 |
| 2005/0114464 A1* | 5/2005 | Amir ............ H04L 67/1097 709/213 |
| 2007/0113036 A1* | 5/2007 | Gal-Oz ............ G06F 3/0608 711/165 |
| 2011/0161496 A1* | 6/2011 | Nicklin ............ G06Q 30/06 709/226 |

* cited by examiner

VIRTUAL VOLUME CONVERTER

BACKGROUND

A virtual volume (VVol) (sometimes called a virtual machine (VM) Volume), is a VMDK (Virtual Machine Disk) stored inside a storage system. Instead of a VM host accessing its virtual disk (VMDK) which is stored in a VMFS formatted data store (part of ESXi hypervisor) built on top of a SCSI LUN (e.g., SAS, SATA, iSCSI, Fibre Channel) or an NFS file system presented by a storage system (or appliance), a VVol pushes more functionality and visibility down into the storage system. In one example, a VVol is a storage container provisioned using VMware vSphere® API (application programming interface) for Storage Awareness (VASA), which aligns to VM boundaries and contains a data store, a set of data services expected, and maintains the metadata of a requested policy.

SUMMARY

In one aspect, a method includes providing virtual volumes (VVols) and mappings from the VVols to corresponding data storage devices to an I/O filter in a first virtual machine (VM), sending control path commands sent from the first VM to a control-path manager VM, the first VM and the control-path manager VM being run on a VM host, intercepting an I/O for a VVol using the I/O filter and sending the intercepted I/O to a data storage device mapped to the VVol.

In another aspect, an apparatus includes electronic hardware circuitry configured to provide virtual volumes (VVols) and mappings from the VVols to corresponding data storage devices to an I/O filter in a first virtual machine (VM), send control path commands sent from the first VM to a control-path manager VM, the first VM and the control-path manager VM being run on a VM host, intercept an I/O for a VVol using the I/O filter and send the intercepted I/O to a data storage device mapped to the VVol.

In a further aspect, an article includes a non-transitory computer-readable medium that stores computer-executable instructions. The instructions cause a machine to provide virtual volumes (VVols) and mappings from the VVols to corresponding data storage devices to an I/O filter in a first virtual machine (VM), send control path commands sent from the first VM to a control-path manager VM, the first VM and the control-path manager VM being run on a VM host, intercept an I/O for a VVol using the I/O filter and send the intercepted I/O to a data storage device mapped to the VVol.

DETAILED DESCRIPTION

Described herein are techniques to form a control-path virtual machine (VM), which behaves as a virtual volume (VVol) storage array and exposes VVols to a hypervisor, but actually the VVols do not really exist. In one example, the control-path VM instructs an I/O filter to redirect the I/Os to other devices which may be traditional virtual disk (VMDK) devices or any other type of virtual devices.

Figure 1:
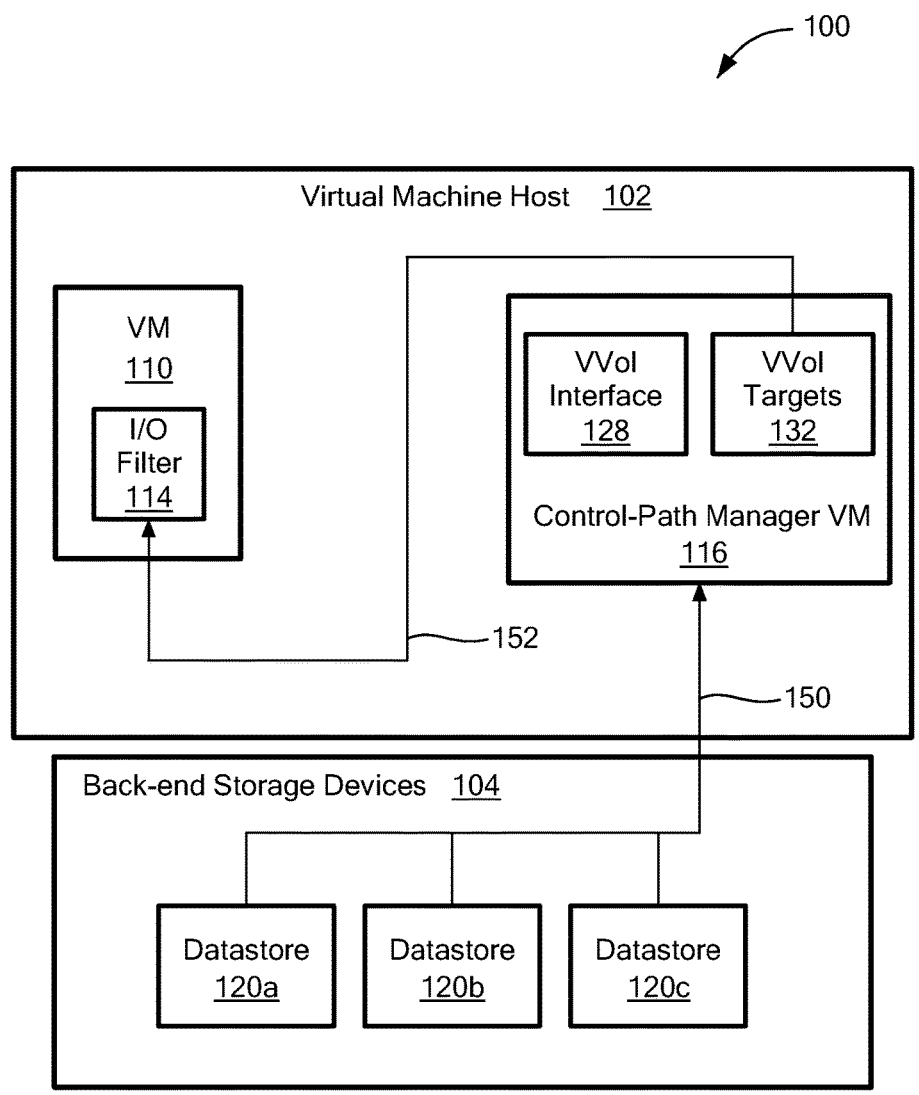
FIG. 1 is a block diagram of an example of a virtual volume converter configuration prior to receiving data and control path commands.
Figure 2:
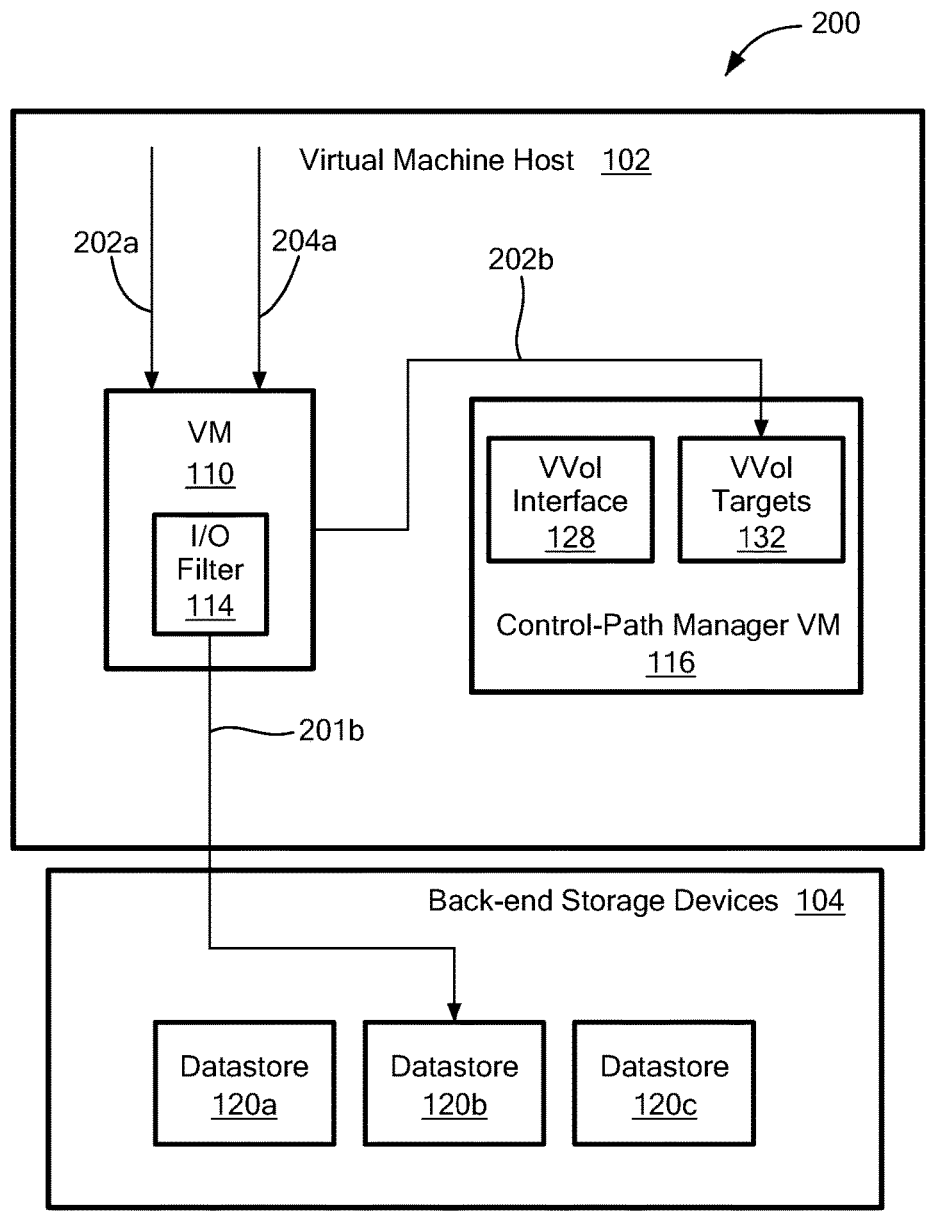
FIG. 2 is a block diagram of an example of a virtual volume converter configuration depicting data path command and control path command flow.

FIG. 1 depicts a virtual volume converter configuration 100 prior to receiving data and control path commands and FIG. 2 depicts a virtual volume converter configuration 200 that includes the same components as the virtual volume converter configuration 100 but shows data path command and control path command flow.

The virtual volume converter configurations 100 and 200 allow for generating a virtualized storage array that can abstract and virtualize multiple back-end storage providers of various types and expose a single end-point for them. In one example, the front-end personality for these devices will conform to the VVol format consumed by the VMWare vSphere infrastructure, and supports the control-path management that is required (through VMWare's VASA APIs).

As will be described herein, the control path for this virtualized device goes through a virtual entity (e.g., a VM) that is responsible for management of the back-end devices and mapping them into virtualized devices, while the data-path itself is fully separated and distributed, handled by a light-weight component running in the host (which is also a VM) context, and does not need to pass through the management VM at all. This provides for unlimited scaling of the data-path which does not need to go through any single bottleneck. This data-path layer can provide intelligent mirroring, caching and additional data-path related enhancements which are distributed across the various hosts rather than centralized in a single location.

This proposal can be used for migrating legacy storage arrays that do not expose VVol functionality as of yet into the VVol paradigm, while not sacrificing performance or generating any bottlenecks due to a centralized virtualization layer through which all I/Os need to go through.

Referring back to FIG. 1, the virtual volume converter configuration 100 includes a virtual machine host 102 and backend storage devices 104. The virtual machine host 102 includes VM 110 and a control-path manager VM 116.

The VM 110 includes an I/O filter 114. The I/O Filter 114 is a filtering mechanism also called VAIO, the I/O filter runs within the same hypervisor user process which runs the virtual machine and can intercept all I/Os generated by the virtual machine and operate on them. The I/O Filter 114 is notified by the control-path manager VM 116, through a connection 152 with the VVol targets 132, about the VVols being exposed by the control-path manager VM 116 and the back-end storage devices 104 that the VVols are maps to. An I/O (sometimes referred to as an I/O (input/output) request) may be a read I/O request (sometimes referred to as a read request or a read) or a write I/O request (sometimes referred to as a write request or a write.

Using a connection 150, the back-end storage devices 104 are attached to the control-path VM 116 (i.e., the back-end storage devices 104 are the internal disks of the control-path VM 116). The Control-path manager VM 116 includes a VVol interface 128 and VVol targets 132. The Control-path manager VM 116 exposes the VVol interface 128. In one example, the VVol interface 128 is a VMware vSphere® API for Storage Awareness (VASA) interface (e.g., VVol-storage provider) and handles the various control-path APIs that are provided through VASA, such as generating a new VVol, exposing the new VVol to the virtual machine host 102 and so forth. When a VVol is generated, the VVol interface 128 maps the VVol to a specific region on the back-end storage 104, which may be a full storage device on the back-end or part of a storage device.

The control-path manager VM 116 also exposes the VVol targets 132 that is used to expose the VVols generated to the virtual machine host 102 itself in the data-path. In one example, the VVol targets 132 are SCSI targets that provides VVols with SCSI personality and responds to any queries. In one particular example, the SCSI target is an iSCSI target.

The back-end storage is consumed by the virtual machine host 102. The back-end storage devices 104 include datastores (e.g., a datastore 120a, a datastore 120b and a datastore 120c). The datastores 120a-120c may include network-attached storage (NAS), a virtual volume (VVol), a storage area network (SAN) and any other storage that can be attached to the virtual machine host 102 as devices.

Referring back to FIG. 2, control path command flows 202a, 204a, such as SCSI discovery commands, for example, are received by the control-path manager VM 116 (i.e., control path command flow 202a is received) and sent in particular to the VVol targets 132 (i.e., control path command flow 202b is sent).

I/Os (i.e., data path commands) are intercepted by the I/O filter 114 (i.e., data path command flow 204a is intercepted path) and re-routed by the I/O filter 114 (i.e., data path command flow 201b is rerouted path) directly to a storage device (e.g., a datastore 120b).

Figure 3:
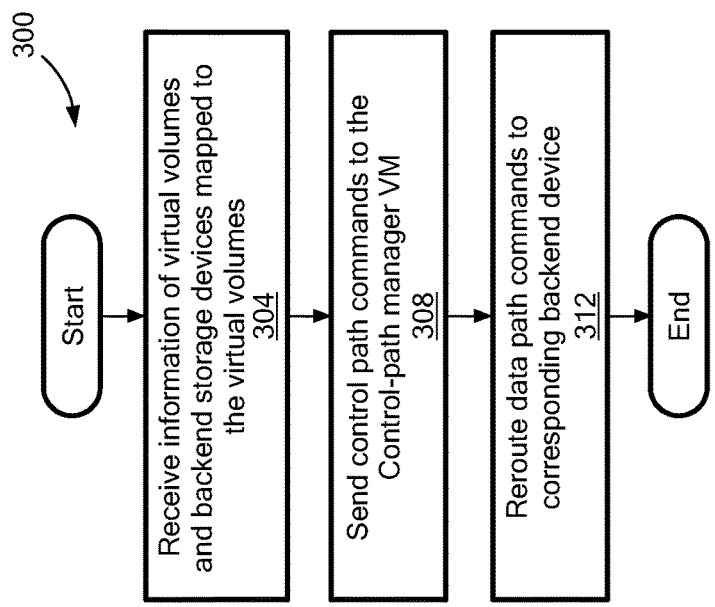
FIG. 3 is a flowchart of an example of a process to handle control and data path commands.

Referring to FIG. 3, a process 300 is an example of a process to handle control and data path commands. Process 300 receives information of virtual volumes and backend storage devices mapped to the virtual volumes (304). For example, the control-path manager 116 provides the virtual volumes and their mapping to the data storage devices 104 to the I/O filter 114.

Process 300 sends control path commands to the control-path manager (308). For example, the control path commands from the VM 110 bypass the I/O filter 114 and go straight to the control-path manager VM 116.

Process 300 reroutes data path commands to a backend device (312). For example, an I/O received by the VM 110 is intercepted by the I/O filter 114 and is rerouted directly to the corresponding datastore of the back-end storage devices 104.

Figure 4:
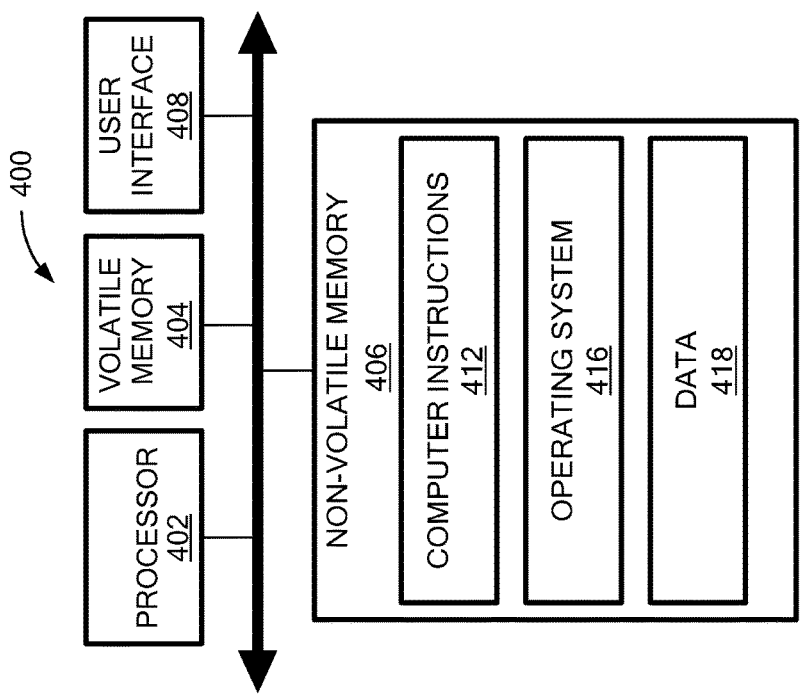
FIG. 4 is a computer on which any portion of the process of FIG. 3 may be implemented.

Referring to FIG. 4, in one example, a computer 400 includes a processor 402, a volatile memory 404, a non-volatile memory 406 (e.g., hard disk) and the user interface (UI) 408 (e.g., a graphical user interface, a mouse, a keyboard, a display, touch screen and so forth). The non-volatile memory 406 stores computer instructions 412, an operating system 416 and data 418. In one example, the computer instructions 412 are executed by the processor 402 out of volatile memory 404 to perform all or part of the processes described herein (e.g., process 300).

The processes described herein (e.g., process 300) are not limited to use with the hardware and software of FIG. 4; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 300 is not limited to the specific processing order of FIG. 3. Rather, any of the processing blocks of FIG. 3 may be re-ordered, combined or removed, performed in parallel or in serial, as necessary, to achieve the results set forth above.

The processing blocks (for example, in the process 300) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
   providing, using a control-path manager virtual machine (VM) comprising virtual volume (VVol) targets, virtual volumes (VVols) and mappings from the VVols to corresponding data storage devices to an I/O filter in a first virtual machine (VM);

sending control path commands sent from the first VM to one or more of the virtual volume targets by bypassing the I/O filter, the first VM and the control-path manager VM being run on a VM host;

intercepting an I/O for a VVol using the I/O filter; and sending the intercepted I/O to a data storage device mapped to the VVol.

2. The method of claim 1, wherein providing the VVols and mappings from the VVols to the corresponding data storage devices comprises using the control-path manager VM to provide the VVols and mappings from the VVols to the corresponding data storage devices.

3. The method of claim 2, wherein using the control-path manager VM to provide the VVols and mappings from the VVols to the corresponding data storage devices comprises using a VVol target, configured to expose VVols configured by the VM host, to provide the VVols and mappings from the VVols to the corresponding data storage devices.

4. The method of claim 1, wherein sending control path commands comprises sending small computer system interface (SCSI) discovery commands.

5. The method of claim 1, further comprising using a VVol interface to provide control-path application programming interfaces (APIs).

6. The method of claim 1, further comprising exposing an application programming interface (API) to allow configuration of VVols using the control-path VM.

7. An apparatus, comprising:

electronic hardware circuitry configured to:

provide, using a control-path manager virtual machine (VM) comprising virtual volume (VVol) targets, virtual volumes (VVols) and mappings from the VVols to corresponding data storage devices to an I/O filter in a first virtual machine (VM);

send control path commands sent from the first VM to one or more of the virtual volume targets by bypassing the I/O filter, the first VM and the control-path manager VM being run on a VM host;

intercept an I/O for a VVol using the I/O filter; and send the intercepted I/O to a data storage device mapped to the VVol.

8. The apparatus of claim 7, wherein the circuitry comprises at least one of a processor, a memory, a programmable logic device or a logic gate.

9. The apparatus of claim 7, wherein the circuitry configured to provide the VVols and mappings from the VVols to the corresponding data storage devices comprises circuitry configured to use the control-path manager VM to provide the VVols and mappings from the VVols to the corresponding data storage devices.

10. The apparatus of claim 9, wherein the circuitry configured to use the control-path manager VM to provide the VVols and mappings from the VVols to the corresponding data storage devices comprises circuitry configured to use a VVol target, configured to expose VVols configured by the VM host, to provide the VVols and mappings from the VVols to the corresponding data storage devices.

11. The apparatus of claim 7, wherein the circuitry configured to send control path commands comprises circuitry configured to send small computer system interface (SCSI) discovery commands.

12. The apparatus of claim 7, further comprising circuitry configured to use a VVol interface to provide control-path application programming interfaces (APIs).

13. The apparatus of claim 7, further comprising circuitry configured to expose an application programming interface (API) to allow configuration of VVols using the control-path VM.

14. An article comprising:

a non-transitory computer-readable medium that stores computer-executable instructions, the instructions causing a machine to:

provide, using a control-path manager virtual machine (VM) comprising virtual volume (VVol) targets, virtual volumes (VVols) and mappings from the VVols to corresponding data storage devices to an I/O filter in a first virtual machine (VM);

send control path commands sent from the first VM to one or more of the virtual volume targets by bypassing the I/O filter, the first VM and the control-path manager VM being run on a VM host;

intercept an I/O for a VVol using the I/O filter; and send the intercepted I/O to a data storage device mapped to the VVol.

15. The article of claim 14, wherein the instructions causing the machine to provide the VVols and mappings from the VVols to the corresponding data storage devices comprises instructions causing the machine to use the control-path manager VM to provide the VVols and mappings from the VVols to the corresponding data storage devices.

16. The article of claim 15, wherein the instructions causing the machine to use the control-path manager VM to provide the VVols and mappings from the VVols to the corresponding data storage devices comprises instructions causing the machine to use a VVol target, configured to expose VVols configured by the VM host, to provide the VVols and mappings from the VVols to the corresponding data storage devices.

17. The article of claim 14, wherein the instructions causing the machine to send control path commands comprises instructions causing the machine to send small computer system interface (SCSI) discovery commands.

18. The article of claim 14, further comprising instructions causing the machine to use a VVol interface to provide control-path application programming interfaces (APIs).

19. The article of claim 14, further comprising instructions causing the machine to expose an application programming interface (API) to allow configuration of VVols using the control-path VM.

* * * * *